Nov. 9, 1954
F. SOLDEVILA ABELLANET
2,693,759
SYSTEM TO RAISE LIQUIDS BY MEANS
OF CHAINS WITH SPECIAL RINGS
Filed March 23, 1950
2 Sheets-Sheet 1
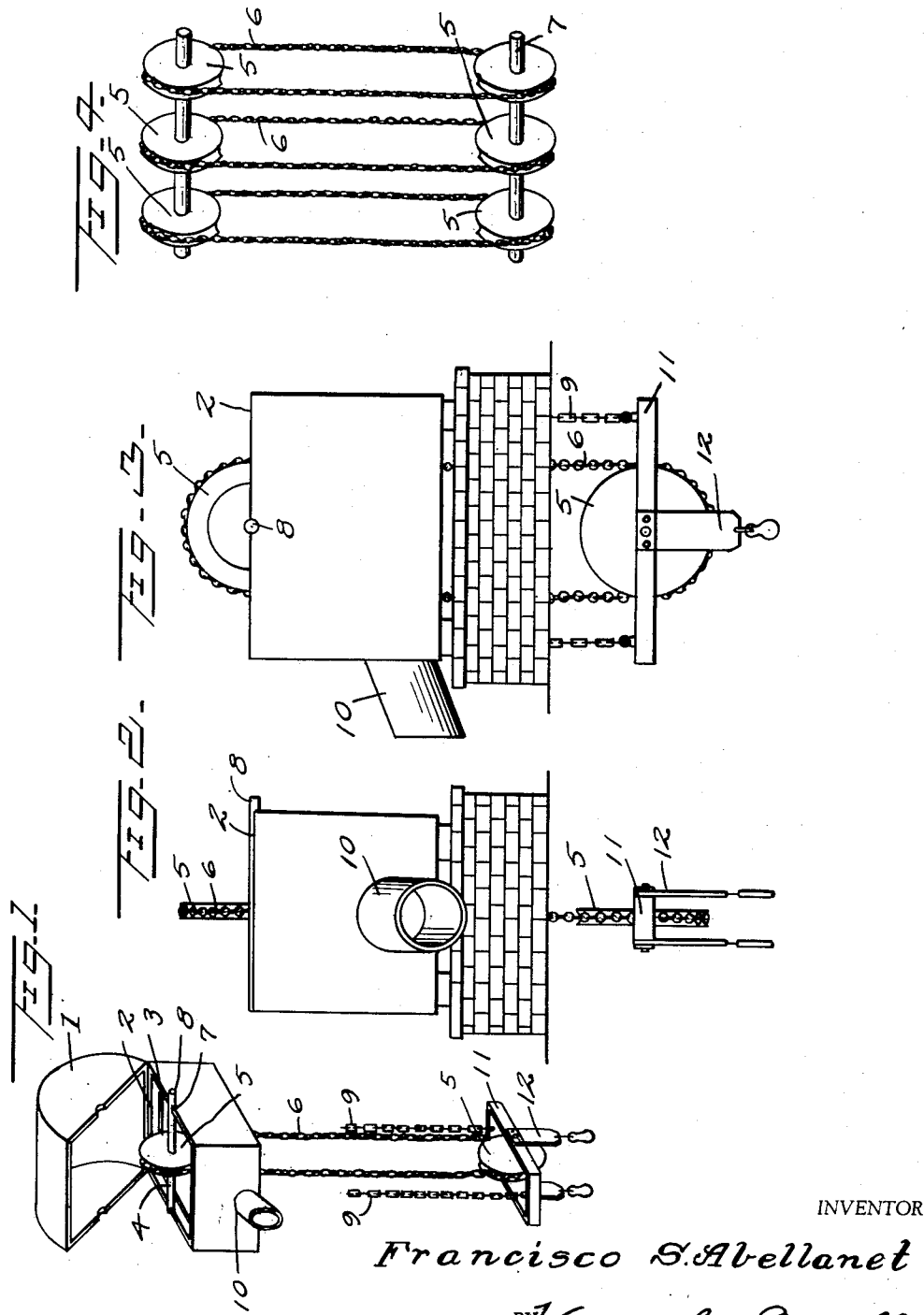
INVENTOR
Francisco S. Abellanet
BY Kimmel & Crowell
ATTORNEYS

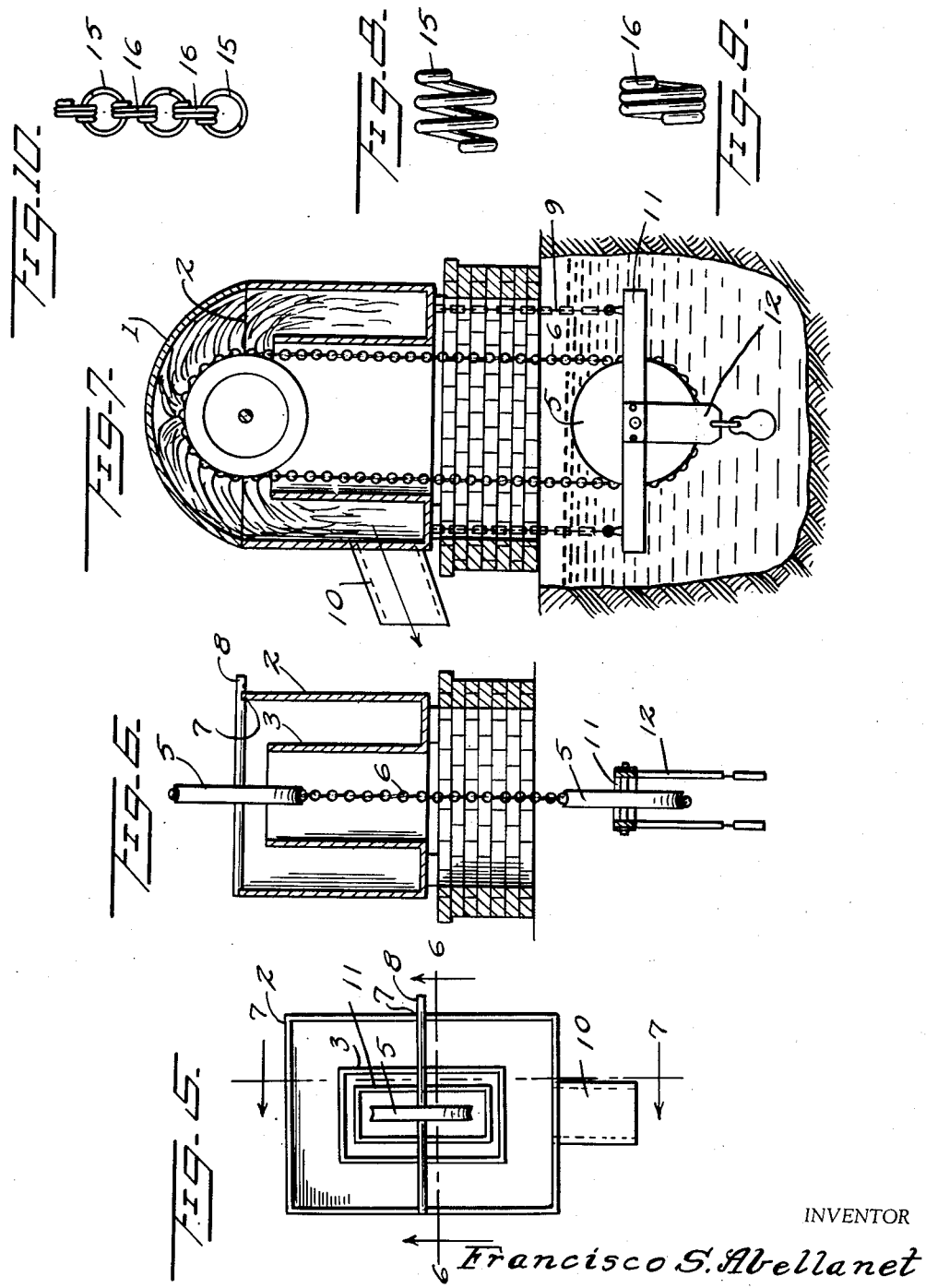

United States Patent Office 2,693,759
Patented Nov. 9, 1954

2,693,759

SYSTEM TO RAISE LIQUIDS BY MEANS OF CHAINS WITH SPECIAL RINGS

Francisco Soldevila Abellanet, Lima, Peru, assignor of twenty per cent to W. O. Runcie and C. N. Griffis, both of Lima, Peru Application March 23, 1950, Serial No. 151,412

2 Claims. (Cl. 103—72)

This invention relates to a system consisting of one or several endless, vertical chains, formed by opposite rings into two or more turns, for raising liquids to any height.

The system of chain of this invention has opposite helical rings, opened and closed, in an alternative arrangement. These rings are of circular shape, and may be of any other shape. The rings are of an adjustable spring type for tensile elongation. The rings are joined between the ends thereof in order that the chain may have an endless rotation. The alternative arrangement of the rings in the chain prevents vibration and slipping, thus avoiding loss of the liquid being raised from the rings.

The chain draws out the liquid in its rings, which because of their arrangement, splits the liquid column, thus making it easier to raise it.

The amount of extraction of liquid by the chain is, at least, twice the volume of the chain diameter, that is, a chain of 1-inch diameter can convey, in a vertical raising, two inches of liquid to the surface, and to great heights. Such a rate is kept whichever the diameter of the chain may be.

One of the principal objects of the chain system of the invention, as applied to pumping, is to eliminate all piping, thus avoiding any loss of energy occasioned by friction of liquid on the walls of such pipes, as in our case the liquid is raised without pipes and to any height.

Another object of the chain system of this invention, as applied to pumping, is the use of the system in various applications ranging from home-use appliances to those conveying millions of liters per hour. The in series system is specially suitable for irrigations.

Another object of the chain system of this invention, as applied to continuous pumping of liquids, is that it can carry, more efficiently than any other known systems, any kind of liquids, even those with suspended materials, as contrasted to the operation of the present pumping systems, in which latter, when the liquids contain any materials in suspension or the liquids are very dense, much efficiency is lost, there being, furthermore, resultant rapid wear in a pipe system.

Another object of the chain system of this invention is that it is operated by means of sprocket-wheels having peripheral semi-circular channels, thus preventing any chain entanglement, the chain operating easily, thus allowing the raising of hundreds of kilograms of liquid per second, without slippage or substantial vibrations. Amongst other things, such vibration would cause a substantial wear, as is the case with other systems of pumping on which it is necessary to use a gearing mesh, clasps, and other means, to prevent any slipping in rotation and loading.

Another general object of the chain system of this invention, as applied to pumping, is that, because of its simple construction, its cost is very low. Also, for same reason, it is easy to set up the system, as it does not require any skilled labor.

Another principal object of the chain system of this invention, as applied to continuous pumping, is that its power consumption is much less when conveying liquids to great heights than any other present pumping system, as on the latter, larger and additional power or energy is required than that wanted by the chain system of this invention for a same volume and to equal height.

Another principal object of the chain system of this invention, as applied to continuous pumping, is that it operates from a single drive means from above, thus avoiding many troubles, such as: repairs in valves, packings, or burning out of electrical motors because of the change of temperatures within the wells. Also the accidents that might arise because of the effect of lethal gases, are eliminated.

Another principal object of the chain system of this invention, as applied to continuous pumping is that the chain, because of its special arrangement in the sprocket-wheels, has but little wear, and, therefore, the replacement thereof is not frequent, though it is the part to be replaced in the long run.

For a better understanding of the invention, reference should be had to the accompanying drawings, wherein:

Fig. 1 is a perspective view of the pump with my special chain system.

Fig. 2 is a front view of the pump shown in Fig. 1.

Fig. 3 is a side view of the mentioned pump.

Fig. 4 is a view of the pump in series with three chains.

Fig. 5 is a top plan view of the pump.

Fig. 6 is a cross-sectional view of the pump taken along the line 6—6 of Fig. 5.

Fig. 7 is a longitudinal cross-sectional view of the pump taken along the line 7—7 of Fig. 5.

Fig. 8 is a side view of a helical ring, of three opened turns.

Fig. 9 is a side view of a helical ring, of three closed turns.

Fig. 10 is a view of the chain formed by six rings, three of them opened, and three closed, and positioned in an alternative arrangement.

Referring to the drawings in detail, the device of the instant invention is comprised essentially of a fluid collector or receiving tank generally indicated at 1, within which is contained a fluid receiving receptacle 2 having a centrally positioned jacket or flange 3 to provide an opening over which is positioned a sprocket 5, having a semi-circular peripheral groove therein for the reception of a chain 6, the latter to be more fully described hereinafter.

The sprocket 5 is mounted on a suitable shaft 7 and provided with a projecting head for the reception of a pulley which may be driven from any desired source of power. An outlet 10 is provided from the receptacle 2.

Depending from the underside of the casing 1 is a pair of chains 9 which support opposite ends of a rectanguler frame 11 which carry a shaft or axle 11', which in turn supports a sprocket or pulley 5' similar to the pulley previously discussed. Suitable weights 12 are adapted to depend from the frame 11 for the stabilizing of the assembly.

Referring back to the chain 6 in detail, and more particularly to Figs. 8, 9 and 10, it will be seen that the chain is comprised of alternate open links 15, as shown in Fig. 8, and closed links 16, as shown in Fig. 9. These links are alternately interconnected as shown in Fig. 10, the longitudinal axis of all of the open links thus extending at substantially right angles to the longitudinal axis of all of the closed links. The arrangement thus provides a certain resiliency which readily permits the adherence of the fluid to be lifted to the chain. These links are preferably made of spring wire or other material and each link is provided with three or more coils. The action of the chain 6 and its associated grooved or channeled pulleys, has a tendency to impart to the chain a horizontal spiral motion as the same is lifted, to add to the efficiency of the lifting arrangement. The chain is driven only from its upper end and needs no support at its lower end, the chain itself, as well as the supplemental chains 9, serving as adequate support, thus obviating the necessity of any below-ground installation.

Obviously, the chains 9 may be suitably adjusted to vary the effective length between the sprockets 5 and 5' and further serve as supplemental support means whereby the lower pulley will not be lost in the event of the breakage of the driving chain.

In the use and operation of the device when the driving sprocket 5 is rotated, the chain will rise and due to the link construction previously described, will raise water on the upgoing side. As the chain is passed over the upper sprocket 5, centrifugal force, plus the lessening of the tension of the spring coils of the chain, will cause the water to be released into the receiving tank 2 from whence it may be directed through the outlet 10 to any desired source.

I claim:

1. A chain for chain-type pumps, comprising alternate connected open and closed helical links, the axes longitudinal to the helix of said open links extending at substantially right angles to the axes longitudinal to the helix of said closed links, each of said links being comprised of at least three coils, the adjacent coils of the open links being spaced apart and the adjacent coils of the lower links being normally in contact but separable upon the application of tension to said chain.

2. In a chain pump, an upper sprocket, a tank supporting said upper sprocket, a lower sprocket extending into a body of fluid to be raised and an endless chain extending between said sprockets and supporting said lower sprocket, said chain being comprised of alternate connected open and closed helical links, the axes longitudinal to the helix of said open links extending at substantially right angles to the axes longitudinal to the helix of said closed links, the adjacent coils of the open links being spaced apart and the adjacent coils of the lower links being normally in contact but separable upon the application of tension to said chain, each of said links being comprised of at least three coils.

References Cited in the file of this patent

UNITED STATES PATENTS

| Number | Name | Date |
|---|---|---|
| 147,045 | Cottle | Feb. 3, 1875 |
| 392,558 | Hinds | Nov. 6, 1888 |
| 988,301 | Bessonnet-Faure | Apr. 4, 1911 |
| 1,007,282 | Hawley | Oct. 31, 1911 |
| 1,358,632 | Grant | Nov. 9, 1920 |
| 1,454,377 | Grant | May 8, 1923 |
| 2,380,144 | Bohannon | July 10, 1945 |
| 2,549,335 | Rahthus | Apr. 17, 1951 |

FOREIGN PATENTS

| Number | Country | Date |
|---|---|---|
| 415,650 | France | July 19, 1910 |
| 497,157 | France | Sept. 2, 1919 |